(No Model.)
H. W. STEBBINS.
DIGESTER.
No. 528,399. Patented Oct. 30, 1894.
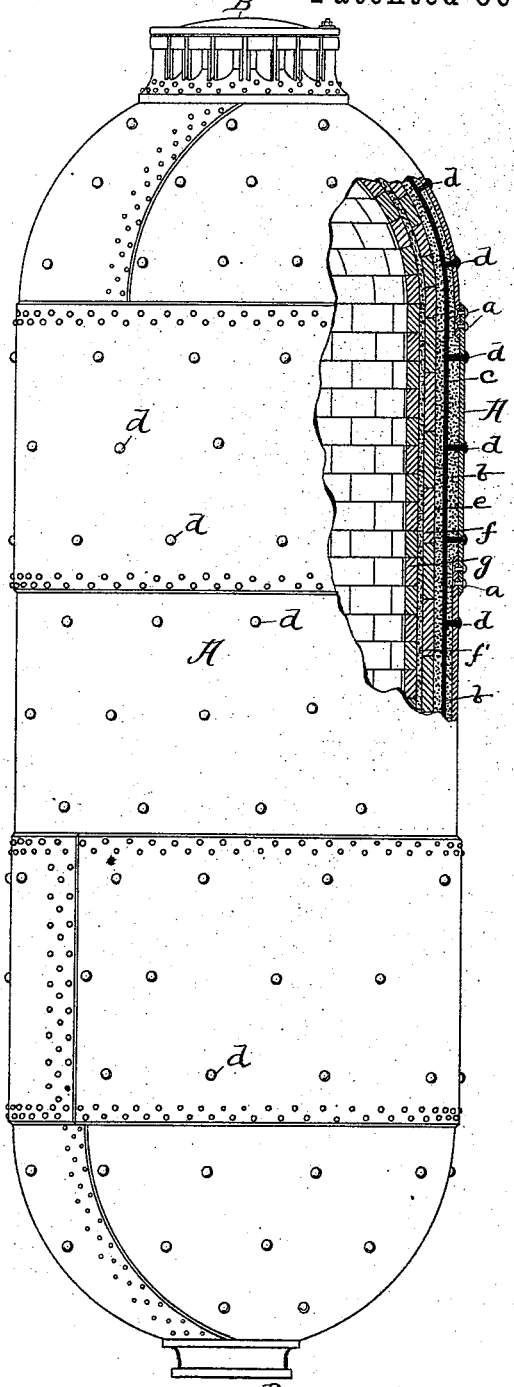
WITNESSES:
INVENTOR
Henry W. Stebbins.
BY
R. J. McCarty
ATTORNEY.

UNITED STATES PATENT OFFICE.

HENRY W. STEBBINS, OF WEST CARROLLTON, ASSIGNOR OF ONE-HALF TO J. H. FRIEND, OF DAYTON, OHIO.

DIGESTER.

SPECIFICATION forming part of Letters Patent No. 528,399, dated October 30, 1894.

Application filed January 26, 1894. Serial No. 498,155. (No specimens.)

*To all whom it may concern:*

Be it known that I, HENRY W. STEBBINS, of West Carrollton, county of Montgomery, State of Ohio, have invented a new and useful Improvement in Digesters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in pulp digesters.

The improvements have reference to the application of an acid-resisting and non-heat-conducting lining to the interior of the metallic shell without reference to any particular construction of shell.

Owing to the severe nature of the liquids used in the digester, in the reduction of stock to pulp, it is important that the iron shell be protected from the disastrous influence thereof, in order that the pulp may be free from any discolorations that might result from the corrosive action of said liquids; and further, that the boiler or shell may be maintained in a serviceable condition for the longest possible time. To maintain a digester in this condition, it becomes necessary at times, to replace the lining. The object of the present invention is to provide a lining adapted to a general application.

While but one form of digester is shown in the drawing, it will be understood that the improved lining is not confined alone to this form.

In the drawing herewith annexed and forming part of the specification, the figure shows a vertical elevation of a digester having a lining constructed in accordance with my invention, a part of this view being in section, to show the lining, which is enlarged.

A A, indicates the shell of hard metal, formed in sections, with over-lapping edges joined by rivets (*a*).

(*b*) is a coating of Portland cement uniformly laid on the interior of the shell to form a smooth surface. The object of this layer of cement is to provide a proper surface against which the lead lining (*c*) is next placed. This lining of lead is secured to the shell by a series of lead rivets (*d*) which are passed through openings in the metallic shell, and the cement, and have their inner ends fused or melted with the lead lining and thereby become an integral part thereof.

(*e*) is a lining placed next to the lead, and composed as far as practicable, of a non-heat-conducting material, preferably of Portland cement and asbestos, which are used in such proportions as will give the composition a sufficient hardness, when set, to withstand the effects of the steam. This composition being of a porous nature, it is essential to impart to it an acid-resisting quality which may be done by adding thereto, lamp black, sulphate of barium, litharge, and silicate of soda, in suitable quantities, say,—ten parts of sulphate of barium, eight parts of litharge, two parts of lamp black mixed with a solution of silicate of soda, about 12° Baumé. Of course it may be desirable to vary these proportions, under some conditions. I find, however, that these proportions are adapted to stand the extreme and sudden changes in the temperatures. Against this composite lining a further lining (*f*) is placed, composed of hydraulic-pressed blocks made of brick clay burned hard, and possessing a porous nature when completed. These porous blocks are set in cement, and in addition to having the effect of preventing the radiation or transmission of heat, they add material strength to the lining (*e*) and form in combination therewith a durable and efficient means of protecting the metallic parts from the ravages of the destroying acids and the compression generated by the steam in operating the digester. Against these porous blocks, a further lining or porous filling *f'* is placed, consisting of Portland cement and sand having a large percentage of silica, and made acid-resisting by the addition of lamp black, sulphate of barium, litharge and silicate of soda in suitable quantities to form a mortar, which is applied by being poured back of the glazed tile (*g*) after said tile have been placed in position. These tile are set in cement, and combined with the composition lining (*f*), protect the linings inter-lying between it and the shell A from becoming worn by friction, and the circulation of steam and acids. The lining thus formed, as a protection to the metal, is effective, simple and inexpensive, and may be applied without reference to any particular construction of digester.

Man-holes B B, are provided at the two extreme ends of the digester. The well known inlets for the steam and acids, &c., it has not been deemed necessary to illustrate, being features common to all implements of this character.

Having described my invention, I claim—

The combination with the boiler shell, of a lining adjacent thereto composed of a layer of cement, a lining of lead adjacent to said cement and secured thereto, and to the boiler or shell, by lead rivets, a lining of non-heat-conducting and acid-resisting material as described, adjacent to said lead lining, a lining of porous blocks adjacent thereto, a further lining or porous filling adjacent to said blocks, and the glazed tile (g) set in cement, adjacent thereto, all combined and placed substantially as herein described and for the purposes specified.

In testimony whereof I have hereunto set my hand this 27th day of December, 1893.

HENRY W. STEBBINS.

Witnesses:
A. M. SULLIVAN,
H. L. DUNN.